(12) United States Patent
Stepnik et al.

(10) Patent No.: US 9,972,408 B2
(45) Date of Patent: May 15, 2018

(54) METHOD FOR PRODUCING NUCLEAR FUEL PRODUCTS WITH A HIGH LOADING OF LEU AND CORRESPONDING NUCLEAR FUEL PRODUCT

(75) Inventors: Bertrand Stepnik, Peyrins (FR); Michel Grasse, Romas sur Isere (FR); Gilles Bourdat, Faramans (FR); Christel Coullomb, Romans sur Isere (FR); Christophe Moyroud, St Paul les Romans (FR)

(73) Assignee: COMPAGNIE POUR L'ETUDE ET LA REALISATION DE COMBUSTIBLES ATOMIQUES, Courbevoie (FR)

( * ) Notice: Subject to any disclaimer, the term of this patent is extended or adjusted under 35 U.S.C. 154(b) by 879 days.

(21) Appl. No.: 14/352,420

(22) PCT Filed: Oct. 21, 2011

(86) PCT No.: PCT/IB2011/002957
§ 371 (c)(1),
(2), (4) Date: May 20, 2015

(87) PCT Pub. No.: WO2013/057533
PCT Pub. Date: Apr. 25, 2013

(65) Prior Publication Data
US 2015/0340110 A1 Nov. 26, 2015

(51) Int. Cl.
*G21C 21/02* (2006.01)
*G21C 3/07* (2006.01)
(Continued)

(52) U.S. Cl.
CPC ............... *G21C 21/02* (2013.01); *B22F 3/10* (2013.01); *B22F 5/00* (2013.01); *B22F 9/04* (2013.01);
(Continued)

(58) Field of Classification Search
CPC . G21C 21/02; G21C 3/02; G21C 3/07; G21C 3/60; G21G 4/08; B22F 3/10; B22F 5/00; B22F 9/04
(Continued)

(56) References Cited

U.S. PATENT DOCUMENTS

| 2,950,188 A | * | 8/1960 | Picklesimer | G21C 3/60 |
| | | | | 376/422 |
| 3,213,032 A | * | 10/1965 | Hammond | G21C 3/62 |
| | | | | 976/DIG. 95 |

(Continued)

FOREIGN PATENT DOCUMENTS

EP    1 345 239 A1    9/2003

OTHER PUBLICATIONS

Keiser, "High-Density, Low-Enriched Uranium Fuel for Nuclear Research Reactors", JOM Journal of the Minerals, Metals and Materials Society, Sep. 2003, pp. 55-58.*
(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

A method of producing a nuclear fuel product is provided. The method includes the steps of providing a core comprising aluminum and low-enriched uranium; and sealing said core in a cladding. The low-enriched uranium has a proportion of U235 below 20 wt %. The core includes more than 80 wt % of a mixture of $UAl_3$ phase and $UAl_4$ phase, and the mixture has a weight fraction of $UAl_3$ phase higher than or equal to 50%, or the core includes more than 50 wt % of $UAl_2$ phase. The core has a low-enriched uranium loading higher than 3.0 $gU/cm^3$. The core includes less than 10 wt % in total of one or several material(s) taken from the list (Continued)

consisting of aluminum phase and aluminum compounds other than $UAl_2$ phase, than $UAl_3$ phase, and than $UAl_4$ phase. A corresponding nuclear fuel product is also provided.

25 Claims, 2 Drawing Sheets

(51) Int. Cl.
   *G21C 3/02* (2006.01)
   *B22F 3/10* (2006.01)
   *B22F 9/04* (2006.01)
   *B22F 5/00* (2006.01)
   *G21C 3/60* (2006.01)
   *G21G 4/08* (2006.01)

(52) U.S. Cl.
   CPC ............... *G21C 3/02* (2013.01); *G21C 3/07* (2013.01); *G21C 3/60* (2013.01); *G21G 4/08* (2013.01); *Y02E 30/38* (2013.01); *Y10T 29/49828* (2015.01)

(58) Field of Classification Search
   USPC .............................. 376/409, 412, 421, 422
   See application file for complete search history.

(56) References Cited

U.S. PATENT DOCUMENTS

| | | | | |
|---|---|---|---|---|
| 4,023,992 | A | * | 5/1977 | Ross ..................... C22C 43/00 148/401 |
| 4,705,577 | A | * | 11/1987 | Ondracek ............. G21C 21/10 376/421 |
| 6,160,862 | A | | 12/2000 | Wiencek et al. |
| 7,430,267 | B2 | * | 9/2008 | Seo ......................... G21C 3/20 376/412 |
| 2011/0255651 | A1 | | 10/2011 | Bashkirtsev et al. |

OTHER PUBLICATIONS

Snelgrove, "Development of very-high-density low-enriched-uranium fuels", Nuclear Engineering and Design 178 (1997) 119-126.*

* cited by examiner

METHOD FOR PRODUCING NUCLEAR FUEL PRODUCTS WITH A HIGH LOADING OF LEU AND CORRESPONDING NUCLEAR FUEL PRODUCT

The present invention relates to a method of producing a nuclear fuel comprising low—enriched uranium and aluminium and to the nuclear fuel product obtained with said method.

BACKGROUND

Such a nuclear fuel product can be particularly used as a primary target to produce elements such as molybdenum-99 (hereafter referred to as "Mo99"), which can in turn serve as a source of technetium-99 which is a standard beta emitter and therefore used for instance for equipment calibration, and in particular of metastable nuclear isomer of technetium-99 (Tc99m) used as radioactive tracer in nuclear medicine and biology.

Such a nuclear fuel product can also be used as nuclear fuel for research nuclear reactors.

The nuclear fuel product generally takes the shape of a plate or a cylinder with a core sealed by a cladding. It is intended to be put in a nuclear reactor to be irradiated, in order to recover Mo99 as a fission product of enriched uranium or to provide neutrons for research applications.

In the prior art, highly enriched uranium (hereafter referred to as "HEU"), that is to say with a content of U235 above 20 wt % and for instance around 93 wt %, is generally used. Particles of $UAl_x$ alloys, mostly containing $UAl_3$ and $UAl_4$ phases, are produced and mixed with an aluminium powder. The mix is then pressed to produce a core comprising $UAl_x$ particles within an Al matrix, the $UAl_x$ particles representing around 20-30% of the final core volume. The core is then hot-rolled along with cladding plates to seal it. As a result, its length is increased by a factor of about 400 to 600%, such plasticity coming from its high aluminium powder content. In case of cylindrical shape, after hot-rolling the plate is bent and welded for instance by arc welding such as Gas Tungsten Arc Welding (GTAW) also known as Tungsten Inert Gas (TIG) welding, by resistance welding . . . .

Due to growing concerns about potential misuse of HEU, there is a need for switching from HEU to low-enriched uranium (referred to as "LEU"), that is to say with a U235 content below 20 wt %, usually around 19.75%. However, nuclear fuel product with LEU leads to less U235 content than HEU nuclear fuel product and thus to a lower Mo99 recovery in primary targets and lower neutron emission of nuclear fuel for research reactor.

For this reason, the particles of mostly $UAl_x$, with x above or equal to 3, are replaced by particles mostly containing the $UAl_2$ phase, which provides a higher uranium-alloy density than both $UAl_3$ and $UAl_4$, hence a higher U235 content to compensate the lower U235 enrichment of the uranium. The $UAl_2$ particles represent about 20-30% of the initial core volume. The nuclear fuel product, after being rolled, undergoes a thermal treatment in order to convert the $UAl_2$ phase into $UAl_x$ in the core, with x above or equal to 3 by using part of the Al matrix. The $UAl_x$ particles represent about 30-40% of the final core volume, the $UAl_2$, $UAl_3$ and $UAl_4$ phases amounting in total to about 50 wt % of the core and the aluminium phase and the other aluminium compounds amounting to about 50 wt %. This thermal treatment generates huge geometrical deformations leading to additional flattening steps with subsequent risks of cladding failures or delamination.

The obtained uranium loading in the core ranges approximately from 2.7 to 3.0 $gU/cm^3$, 3.0 $gU/cm^3$ being the technological limit achievable for nuclear fuel products made of $UAl_x$ alloy, with the described prior art manufacturing processes.

SUMMARY OF THE INVENTION

An aim of the invention is to provide a method of producing a cost effective nuclear fuel product based on LEU which, when used as a primary target, provides an improved Mo99 recovery and, when used as a nuclear fuel for research reactor, provides a higher quantity of neutrons.

To this end, the invention proposes a method of producing a nuclear fuel product, the method comprising the steps of:
providing a core comprising aluminium and low-enriched uranium; and
sealing said core in a cladding;
wherein said core has a low-enriched uranium loading strictly higher than 3.0 $gU/cm^3$ and comprises less than 10 wt % of aluminium phase and/or aluminium compounds other than $UAl_2$ phase, than $UAl_3$ phase, and than $UAl_4$ phase.

In other embodiments, the method comprises one or several of the following features, taken in isolation or any technical feasible combination:
said cladding comprises one or several of an aluminium alloy, a zirconium alloy such as Zircaloy-2, Zircaloy-4 or Zr—Nb alloy, a Ni-based alloy such as Alloy 600, stainless steel such as AISI 304L or AISI 316L;
said cladding is an aluminium alloy comprising more than 95 wt % of aluminium;
wherein said core comprises more than 80 wt % of a mixture of $UAl_3$ phase and $UAl_4$ phase, said mixture having a weight fraction of $UAl_3$ phase higher than or equal to 50%;
said core comprises more than 80 wt % of $UAl_3$ phase;
said core comprises more than 50 wt % of $UAl_2$ phase, preferably more than 80 wt % of $UAl_2$ phase;
the step of providing said core comprises the substep of melting low-enriched uranium and aluminium in a furnace to form a melt, the proportion of low-enriched uranium in the melt being higher than or equal to 68 wt % and lower than or equal to 82 wt %;
the proportion of low-enriched uranium in the melt is higher than or equal to 71 wt % and lower than or equal to 75 wt %;
the proportion of low-enriched uranium in the melt is higher than or equal to 73 wt % and lower than or equal to 75 wt %;
the proportion of low-enriched uranium in the melt is higher than or equal to 75 wt % and lower than or equal to 82 wt %, preferably higher than or equal to 78 wt % and lower than or equal to 82 wt %;
the step of providing said core comprises the substeps of:
providing a ingot from the melt;
grinding said ingot to produce a powder;
compacting said powder to produce a compact; and
sintering said compact to obtain the core;
the step of providing said core comprises, prior to the substep of compacting said powder, the substep of adding aluminium to said powder, the weight proportion of aluminium in the powder being lower than or equal to 10 wt %;

the step of sealing said core in said cladding comprises the substeps of:
  enclosing said core in framing elements to obtain a sandwich; and
  rolling said sandwich in order to extend a core length along a rolling direction by a factor between 1% and 50%, preferably between 5% and 30% and more preferably around 10%;
the step of providing said core comprises the substep of casting the melt in order to make a compact;
said core also comprises an additional element, the weight proportion of said additional element in the core being lower than or equal to 3 wt %;
as an alternative to said substeps of melting LEU and aluminium in a furnace, providing an ingot from said melt, and grinding said ingot to obtain powder, said powder is obtained by an atomization process, for example the atomization process described in patent FR 2 777 688.

The invention also relates to a nuclear fuel product comprising:
  a core comprising aluminium and low-enriched uranium; and
  a cladding sealing the core;
wherein said core has a low-enriched uranium loading strictly higher than 3.0 gU/cm$^3$ and comprises less than 10 wt % of aluminium and/or aluminium compounds other than UAl$_2$ phase, than UAl$_3$ phase, and than UAl$_4$ phase.

In other embodiments, the nuclear fuel product comprises one or several of the following features, taken in isolation or any technical feasible combination:
  said cladding comprises one or several of an aluminium alloy, a zirconium alloy such as Zircaloy-2, Zircaloy-4 or Zr—Nb alloy, a Ni-based alloy such as Alloy 600, stainless steel such as AISI 304L or AISI 316L;
  said cladding is an aluminium alloy comprising more than 95 wt % of aluminium;
  said core comprises more than 80 wt % of a mixture of UAl$_3$ phase and UAl$_4$ phase, said mixture having a weight fraction of UAl$_3$ phase higher than or equal to 50%;
  said core comprises more than 80 wt % of UAl$_3$ phase;
  said core comprises more than 50 wt % of UAl$_2$ phase, preferably more than 80 wt % of UAl$_2$ phase;
  said core also comprises an additional element, the weight proportion of said additional element in the core being lower than or equal to 3 wt %.

The invention also relates to using the nuclear fuel product as a nuclear fuel in a nuclear research reactor, for example in order to produce neutrons.

The invention also relates to using the nuclear fuel product as a primary target, for example to produce elements such as molybdenum-99.

BRIEF SUMMARY OF THE DRAWINGS

The invention and its advantages will be better understood on reading the following description given solely by way of example and with reference to the appended drawings, in which.

DETAILED DESCRIPTION

Figure 1:
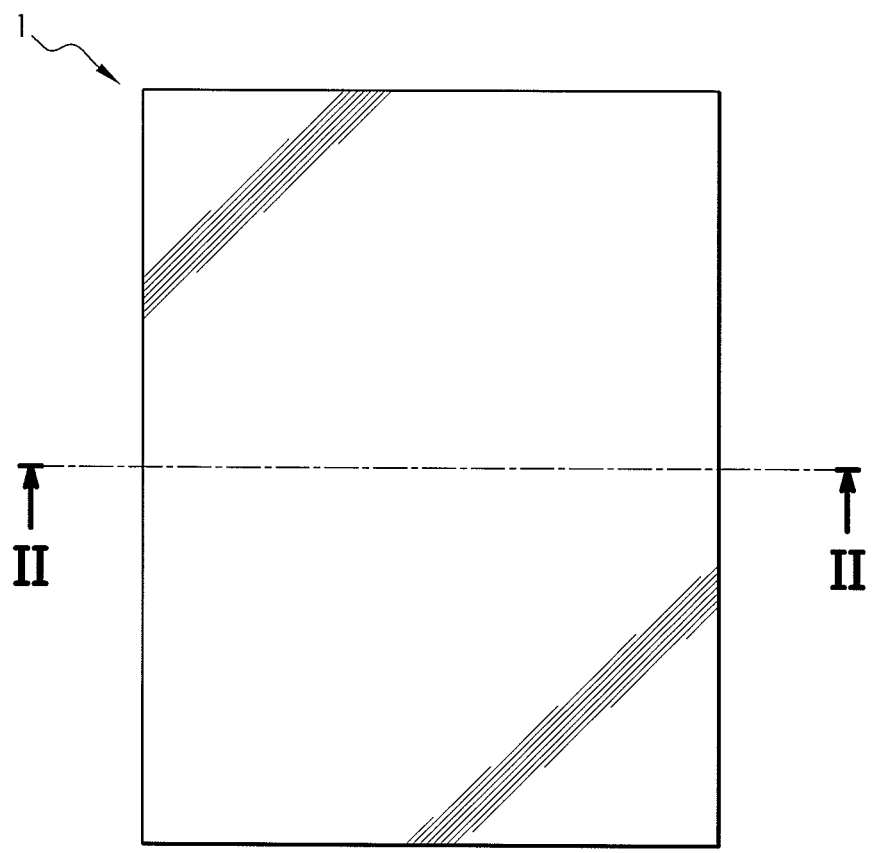
FIG. 1 is a front view of a nuclear fuel product according to the invention.

FIG. 1 illustrates a nuclear fuel product 1 which is intended to be used as a primary target in order to obtain Mo99 and, as such, to be put in a nuclear reactor, or as a nuclear fuel for a research nuclear reactor in order to obtain neutrons.

Typically, the nuclear fuel product 1 has the shape of a plate with a length of e.g. 180 mm for a primary target and until around 800 mm for a nuclear fuel for research reactor, a width of e.g. 60 to 90 mm, and a thickness of e.g. 2 mm. To obtain a cylindrical nuclear fuel product 1 the plate is bent and welded on a diameter usually about 20 to 50 mm, e.g. 30 mm.

Figure 2:
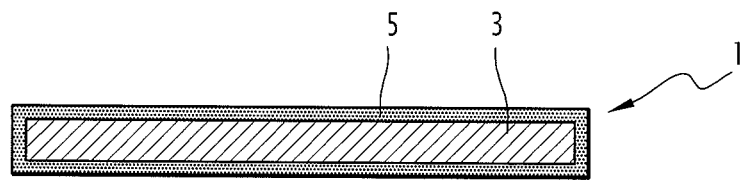
FIG. 2 is a cross section of the nuclear fuel product taken along line II-II of FIG. 1.

As illustrated by FIG. 2, the nuclear fuel product 1 comprises:
  a core 3 comprising aluminium and LEU; and
  a cladding 5 sealing said core 3.

By "LEU", it is meant that the proportion of U235 in the uranium is below 20 wt %, for example around 19.75 wt %. The core 3 has a LEU loading strictly higher than 3.0 gU/cm$^3$, preferably more than 4.0 gU/cm$^3$, and comprises, in addition to unavoidable impurities resulting from manufacturing processes, less than 10 wt % of Al phase and/or aluminium compounds other than UAl$_x$ phase with x above or equal to 2.

Advantageously the core 3 comprises more than 90% of a mixture of UAl$_2$, UAl$_3$, and UAl$_4$ phases.

In specific embodiments, the nuclear fuel product 1 may be used as a primary target or as a nuclear fuel, for example in a research reactor and the core 3 comprises more than 80 wt % of a mixture of the UAl$_3$ and UAl$_4$ phases, said mixture having a weight fraction of UAl$_3$ phase higher than or equal to 50%, and preferably the core 3 comprises more than 80 wt % of the UAl$_3$ phase.

In another specific embodiment, the nuclear fuel product 1 is dedicated to primary targets and the core 3 comprises more than 50 wt % of UAl$_2$, preferably more than 80 wt % and even more than 90 wt % of UAl$_2$.

Advantageously, the core 3 also comprises an additional element, such as silicon, tantalum, niobium, or more generally any of the elements disclosed in patent FR 1 210 887, or a mixture thereof, the weight proportion of said additional element(s) in the core 3 being lower than or equal to 3 wt % and preferably lower than or equal to 1 wt %.

The cladding 5 prevents the LEU from migrating from the core 3 to outside the nuclear fuel product 1. It also holds the fission products generated in the core 3 during its irradiation.

The material used for the cladding 5 may be any materials generally used in nuclear reactor, i.e. an aluminium alloy, a zirconium alloy such as Zircaloy-2, Zircaloy-4 or Zr—Nb alloy, a Ni-based alloy such as Alloy 600, or stainless steel such as AISI 304L or AISI 316L.

Advantageously the material used for the cladding 5 is an aluminium alloy comprising more than 95 wt % of aluminium.

For example the following alloys may be used:
  EN AW-5754, also known as AG3, comprising about 3 wt % of magnesium (ASTM B209/B308M),
  EN AW-6061, comprising about 1 wt % of magnesium and 0.6 wt % of silicon (ASTM B308/B308M), or
  an AlFe1Ni1 alloy.

The method for producing the nuclear fuel product 1 generally comprises two main steps:

a first step of providing the core 3, and a second step of sealing said core 3 in the protective cladding 5.

Examples of a method for producing the nuclear fuel product 1 will now be disclosed.

The core 3 is first produced through several substeps.

In a first substep, LEU and aluminium are melted in a furnace to obtain an U—$Al_x$ for instance in an arc furnace, an induction furnace or a resistance furnace. Advantageously, the proportion of LEU in the melt is higher than or equal to 68 wt % and lower or equal to 82 wt %, preferably higher than or equal to 71 wt % and lower than or equal to 75 wt % and more preferably higher than or equal to 73 wt % and lower than or equal to 75 wt %.

In an alternative, the proportion of LEU in the melt is higher than or equal to 75 wt % and lower or equal to 82 wt % and more preferably higher than or equal to 78 wt % and lower than or equal to 82 wt %.

If any, the above mentioned additional element(s) may be added to the melt in this first substep.

In a second substep, the melt is poured into a mould in order to form an ingot.

In a third substep, the ingot is grinded in order to obtain a U—$Al_x$ powder.

Advantageously the average size of the U—$Al_x$ powder particles is less than 100 μm, for example around 40-70 μm.

For determining the aluminium powder particle size, laser granulometry can advantageously be used, in accordance with standard NF ISO 13320.

The U—$Al_x$ particles size is advantageously set using two sieves with 40 μm and with 125 μm mesh. Using the sieves the U—$Al_x$ powder is separated into three fractions (below 40 μm, between 40 μm and 125 μm, and above 125 μm). The fraction above 125 μm is removed and the fractions between 0-40 μm and between 40-125 μm can be mixed in a given proportion, for example 60 wt % of 0-40 μm and 40 wt % of 40-125 μm, leading to an average particle size of around 40-70 μm.

In a fourth substep, aluminium powder is added to the U—$Al_x$ powder, the added aluminium being dispersed in the U—$Al_x$ powder and representing less than 10 wt % in the mixed powder.

If any and if not already added in substep 1, the above mentioned additional element(s) may be added during this fourth substep.

In a fifth substep, the mixed powder is compacted to obtain a compact, for example having the shape of a parallelepiped. Advantageously, the compact has approximately the final width of the core 3 in the nuclear fuel product 1, 80% to 90% of the final length of the core 3 and around twice the final thickness of the core 3.

In a sixth substep, the compact is sintered, advantageously under vacuum at a temperature ranging between 500° C. and 1000° C., to obtain the core 3, which has a porosity below or equal to 10%, preferably below 5%. Advantageously, the core 3 has a thickness comprised between 110% and 120% of the thickness it will have in the nuclear fuel product 1.

The porosity of the compact is advantageously determined by weighing the compact in air, then in water. During the latter measurement, the compact is completely immersed in water, with no air bubbles present on the suspension mechanism or on the compact. The porosity can then be calculated, knowing the theoretical density of the $UAl_x$ material that the particles are made of.

As an alternative, to shorten treatment duration and/or reduce the quantity of residual porosities, the sintering substep can be performed under high pressure, advantageously between 200 and 1000 bars, and at a temperature in the 400° C.-900° C. range.

As an alternative to the first, second and third substeps, the U—$Al_x$ powder may be obtained by an atomization process, for example the atomization process described in patent FR 2 777 688.

As an alternative to the fifth and sixth substeps, the mixed powder may be cold-sprayed on a surface, preferably a surface of the cladding 5, advantageously at a temperature between 300 and 500° C. Cold-spraying results in a dense and high quality deposit.

As an alternative no aluminium powder may be added in the fourth substep.

As an alternative to the second to sixth substeps, the melt may be directly cast in a mold having directly the size of the core 3, the additional elements, if any, being added in the first substep.

The step of sealing the core 3 with the cladding 5 also comprises several substeps.

Figure 3:
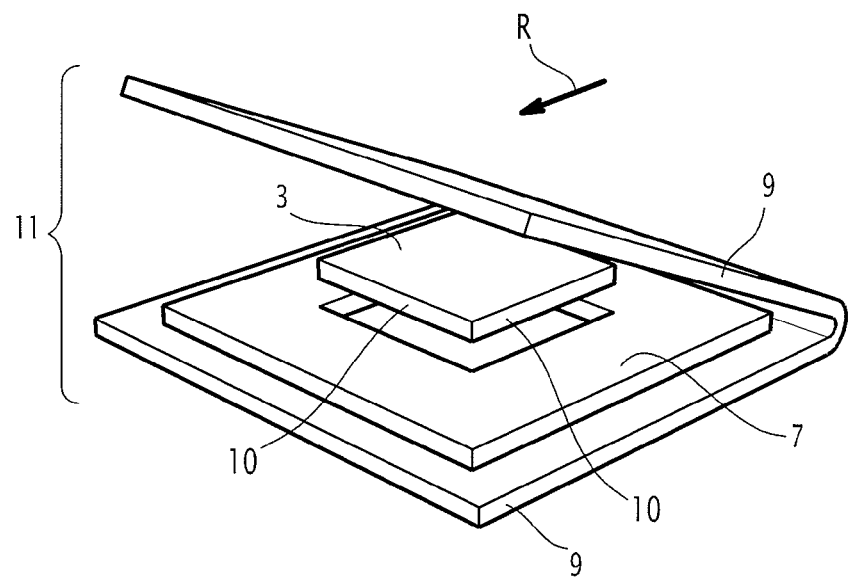
FIGS. 3 and 4 illustrate the step of sealing the core of the nuclear fuel product shown in FIGS. 1 and 2.

In a first substep, as illustrated by FIG. 3, the core 3 is put in a frame 7, made of the same material as the cladding 5 or a material allowing further sticking of the frame and the cladding, positioned along the sides 10 of the core 3. It should be noted that, on FIGS. 3 and 4, the width of the plates 9 and frame 7 have been exaggerated.

The frame 7 may comprise several pieces and preferably consists of one piece.

In a second substep, the core 3 and the frame 7 are enclosed by an upper and a lower plates 9, the upper and the lower plates 9 forming the cladding, in order to form a sandwich 11 comprising the core 3, the frame 7, and the upper and lower plates 9. The upper and lower plates 9 will form the cladding 5, once the sandwich 11 is sealed as disclosed hereunder.

The frame 7 and the upper and lower plates 9 are also referred to as "framing elements".

Figure 4:
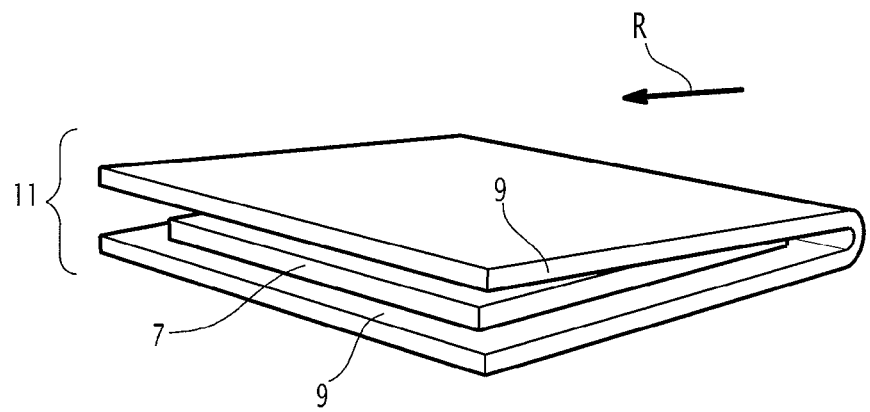

The upper and lower plates 9 may be obtained by folding a sheet as shown on FIGS. 3 and 4. In FIG. 4, the sandwich 11 is in the process of being closed, by pressing on both external faces of the plates 9.

When using a folded sheet such the one shown on FIGS. 3 and 4, only three sides of the folded sheet must be bonded together in order to seal the sandwich 11. When two separate plates are used, four sides must be bonded together to seal the sandwich 11.

In a third substep the sandwich 11 is hot-rolled to bond the frame 7 and the upper and lower plates 9 together. The hot-rolling is preferably performed at a temperature higher than or equal to 300° C. and preferably between 400-450° C., and preferably performed along a direction R.

The rolling rate, defined as the increase in length of the core 3 along the rolling direction R during the third substep, is advantageously comprised between 1% and 50%, preferably between 5% and 30% and more preferably between 8-15%.

The third substep (hot-rolling in this example) brings the core 3 to its final thickness and size and ensures a proper sealing of the core 3 inside the cladding 5 formed by the frame 7 and the upper and lower plates 9.

In a fourth substep, the final dimensions of the nuclear fuel product 1 are adjusted by cutting its edges, by any cutting mean such as press cutting, water cutting, laser cutting . . . .

In a fifth substep, the nuclear fuel product 1 is submitted to a chemical cleaning according to known processes.

Optionally cold-rollings at room temperature may be performed between the third and fourth substeps to adjust the thickness and the length of the core 3.

If needed, an additional substep may be added after the fourth substep to adjust the thickness of the nuclear fuel product 1, for instance by machining, chemical etching . . . .

As an alternative, in the second substep, an intermediate material, for instance of Ni-alloy, may be positioned around the core 3 to avoid sticking of the core 3 on the cladding 5 during the third substep.

As an alternative to the third substep, the cladding 5 is welded on the frame 7 under vacuum, typically by electron beam welding, in order to seal the core 3 inside the cladding 5. To reduce the porosity of the core 3 and the gaps between the components, the welded sandwich 11 is then submitted to Hot Isostatic Pressing (HIP).

The relatively small rolling rate, advantageously between 1% and 50%, preferably between 5% and 30% and more preferably around 10%, makes the rolling possible without cracking of the core 3, despite the relatively low content, indeed the absence, of aluminium powder in the core 3. The risk of an accumulation of the cladding material towards the ends of the core 3 during rolling, known in the art as "dog-boning", is reduced, leading to a possible reduction of the thickness of the cladding 5.

As a consequence of the reduced amount or the absence of aluminium powder in the core 3, the achievable technological limit for the uranium loading in the core 3 is shifted from 3.0 gU/cm$^3$ to strictly more than 3.0 gU/cm$^3$ for 80 wt % of a mixture of the $UAl_3$ and $UAl_4$ phases having a weight fraction of $UAl_3$ phase higher than or equal to 50% in the core 3. The technological limit is even shifted to more than 4.5 gU/cm$^3$ with more than 80 wt % of the $UAl_3$ phase in the core 3 and even above or equal to 6.0 gU/cm$^3$ with more than 90 wt % of $UAl_2$ phase in the core 3, allowing to compensate for the decrease of uranium enrichment in U235 isotope.

Thanks to the relatively high LEU loading in the core 3, the nuclear fuel product 1, provides an improved recovery of Mo99 when used as a primary target, and a higher quantity of neutrons when used as a nuclear fuel in a nuclear research reactor.

Furthermore, the overall aluminium content of the nuclear fuel product 1 being low, the amount of aluminium in effluents after dissolution of the irradiated nuclear fuel product 1 used as a primary target to recover Mo99 is moderate.

With an enhanced Mo99 recovery and less aluminium in the effluents, the nuclear fuel product 1 used as a primary target is very cost effective.

In case the nuclear fuel product 1 is used as nuclear fuel in a nuclear research reactor, the content of the $UAl_2$ phase in the core 3 being low, the risk of instability during irradiation is reduced.

Adding additional element(s) in the melt, such as silicon, tantalum, niobium . . . , the weight proportion of said additional element(s) in the core 3 being lower than or equal to 3 wt %, allows reducing the weight proportion of the $UAl_4$ phase in the melt, compared to a melt without such additional element.

Adjusting the proportion of LEU in the melt at a level higher than or equal to 68 wt % and lower or equal to 82 wt % enables to obtain a core 3 comprising at least 90 wt % of a mixture of $UAl_2$, $UAl_3$, and $UAl_4$, without any additional thermal treatment on the nuclear fuel product 1.

Adjusting the proportion of LEU in the melt at a level higher than or equal to 71 wt % and lower or equal to 75 wt % enables to obtain a core 3 comprising at least 80 wt % of a mixture of $UAl_3$ and $UAl_4$.

Adjusting the proportion of LEU in the melt at a level higher than or equal to 73 wt % and lower or equal to 75 wt % enables to obtain a core 3 comprising at least 80 wt % of $UAl_3$.

Using the nuclear fuel product 1 without $UAl_2$ phase avoids any modifications of the existing manufacturing, irradiation and dissolution processes and associated equipments and reactors.

Adjusting the proportion of LEU in the melt at a level higher than or equal to 78 wt % and lower or equal to 82 wt % enables to obtain a core 3 comprising at least 80 wt % of $UAl_2$ without U metal phase.

Adding a small amount, less than 10 wt %, of aluminium powder in the U—$Al_x$ powder obtained after grinding improves the plasticity of the compact in view of further rolling.

Grinding the ingot into powder and then sintering the compact made from the powder provides a good homogeneity of the core 3 and allows reducing its porosity to a desired level. Setting the porosity level below 10%, preferably below 5%, helps increasing the LEU loading in the core 3.

Direct casting of the core 3 leads to a non-porous core 3 with a reduced Al content (no addition of Al powder) obtained by a simplified manufacturing route.

HIP process allows working directly in the core geometry avoiding failures of the nuclear fuel product 1 during rolling steps.

What is claimed is:

1. A method of producing a nuclear fuel product, the method comprising:
    providing a core comprising aluminium and low-enriched uranium, the low-enriched uranium having a proportion of U235 below 20 wt %; and
    sealing the core in a cladding;
        the core comprising a first composition including more than 80 wt % of a mixture of $UAl_3$ phase and $UAl_4$ phase, and the mixture having a weight fraction of $UAl_3$ phase higher than or equal to 50%, or
        the core comprising a second composition including more than 50 wt % of $UAl_2$ phase,
    the core having a low-enriched uranium loading higher than 3.0 gU/cm$^3$, the core comprising less than 10 wt % in total of one or several material(s) taken from the list consisting of aluminium phase and aluminium compounds other than $UAl_2$ phase, than $UAl_3$ phase, and than $UAl_4$ phase.

2. The method as recited in claim 1 wherein the cladding comprises one or several of an aluminium alloy, a zirconium alloy, a Ni-based alloy and a stainless steel.

3. The method as recited in claim 2 wherein the aluminium alloy comprises more than 95 wt % of aluminium, the zirconium alloy is Zircaloy-2, Zircaloy-4 or a Zr—Nb alloy, the Ni-based alloy is Alloy 600 and the stainless steel is AISI 304L or AISI 316L.

4. The method as recited in claim 1 wherein the core comprises the second composition.

5. The method as recited in claim 4 wherein the core comprises more than 80 wt % of $UAl_3$ phase.

6. The method as recited in claim 1 wherein the core comprises the second composition preferably more than 80 wt % of $UAl_2$ phase.

7. The method as recited in claim 1 wherein the step of providing the core comprises the substep of melting low-enriched uranium and aluminium in a furnace to form a melt, the proportion of low-enriched uranium in the melt being higher than or equal to 68 wt % and lower than or equal to 82 wt %.

8. The method as recited in claim 7 wherein the proportion of low-enriched uranium in the melt is higher than or equal to 71 wt % and lower than or equal to 75 wt %, wherein the core comprises the first composition.

9. The method as recited in claim 7 wherein the proportion of low-enriched uranium in the melt is higher than or equal to 73 wt % and lower than or equal to 75 wt %, wherein the core comprises more than 80 wt % of $UAl_3$ phase.

10. The method as recited in claim 7 wherein the proportion of low-enriched uranium in the melt is higher than or equal to 75 wt % and lower than or equal to 82 wt % wherein the core comprises the second composition.

11. The method as recited in claim 7 wherein the step of providing the core comprises the substeps of:
    providing a ingot from the melt;
    grinding the ingot to produce a powder;
    compacting the powder to produce a compact; and
    sintering the compact to obtain the core.

12. The method as recited in claim 11 wherein the step of providing the core comprises:
    prior to the substep of compacting the powder, the substep of adding aluminium to the powder, the weight proportion of aluminium in the powder being lower than or equal to 10 wt %.

13. The method as recited in claim 1 wherein the step of sealing the core in the cladding comprises the substeps of:
    enclosing the core in framing elements to obtain a sandwich; and
    rolling the sandwich in order to extend a core length along a rolling direction R by a factor between 1% and 50%.

14. The method as recited in claim 10 wherein the proportion of low-enriched uranium in the melt is higher than or equal to 78 wt % and lower than or equal to 82 wt %.

15. The method as recited in claim 10 wherein the core comprises more than 80 wt % of $UAl_2$ phase.

16. The method as recited in claim 13 wherein the rolling of the sandwich extends the core length by between 5% and 30% and more preferably around 10%.

17. The method as recited in claim 6 wherein the core comprises more than 80% of $UAl_2$ phase.

18. A nuclear fuel product comprising:
    a core comprising aluminium and low-enriched uranium, the low-enriched uranium having a proportion of U235 below 20 wt %; and
    a cladding sealing the core;
        the core comprising a first composition including more than 80 wt % of a mixture of $UAl_3$ phase and $UAl_4$ phase, and the mixture having a weight fraction of $UAl_3$ phase higher than or equal to 50%, or
        the core comprising a second composition including more than 50 wt % of $UAl_2$ phase,
    the core having a low-enriched uranium loading higher than 3.0 $gU/cm^3$ and comprises less than 10 wt % in total of one or several material(s) taken from the list consisting of aluminium phase and aluminium compounds other than $UAl_2$ phase, than $UAl_3$ phase, and than $UAl_4$ phase.

19. The nuclear fuel product as recited in claim 18 wherein the cladding comprises one or several of an aluminium alloy, a zirconium alloy, a Ni-based alloy and a stainless steel.

20. The nuclear fuel product as recited in claim 19 wherein the aluminium alloy comprises more than 95 wt % of aluminium, the zirconium alloy is Zircaloy-2, Zircaloy-4 or a Zr—Nb alloy, the Ni-based alloy includes Alloy 600 and the stainless steel is AISI 304L or AISI 316L.

21. The nuclear fuel product as recited in claim 18 wherein the core comprises the first composition.

22. The nuclear fuel product as recited in claim 21 wherein the core comprises more than 80 wt % of $UAl_3$ phase.

23. The nuclear fuel product as recited in claim 18 wherein the core comprises the second composition.

24. The method as recited in claim 16 wherein the rolling of the sandwich extends the core length by around 10%.

25. The nuclear fuel product as recited in claim 23 wherein the core comprises more than 80 wt % of $UAl_2$ phase.

* * * * *

UNITED STATES PATENT AND TRADEMARK OFFICE
CERTIFICATE OF CORRECTION

PATENT NO. : 9,972,408 B2  
APPLICATION NO. : 14/352420  
DATED : May 15, 2018  
INVENTOR(S) : Bertrand Stepnik et al.

Page 1 of 1

It is certified that error appears in the above-identified patent and that said Letters Patent is hereby corrected as shown below:

In the Claims

Please replace "second composition" with "first composition" in Claim 4, at Column 8, Line 62.

Signed and Sealed this  
Eleventh Day of June, 2019

Andrei Iancu  
*Director of the United States Patent and Trademark Office*